United States Patent [19]
Tice

[11] 3,776,350
[45] Dec. 4, 1973

[54] GUIDE RAIL SUPPORT
[76] Inventor: Joseph Tice, 502 Poinsettia Dr., Simpsonville, S.C.
[22] Filed: June 8, 1972
[21] Appl. No.: 260,830

[52] U.S. Cl. ............................................... 198/204
[51] Int. Cl. ............................................ B65g 15/60
[58] Field of Search ...................... 198/204, 29–30, 198/184; 248/124, 287

[56] References Cited
UNITED STATES PATENTS
3,368,666  2/1968  Stone ................................ 198/204

1,766,377  6/1930  Gaede ............................ 248/287 X

FOREIGN PATENTS OR APPLICATIONS
334,093  10/1904  France .............................. 248/124

Primary Examiner—Edward A. Sroka
Attorney—Ralph Bailey et al.

[57] ABSTRACT

A guide rail for conveyors and the like, which can be readily adjusted with a spring in a horizontal direction to accommodate bottles of various sizes being shifted along on the conveyor. A spring means is also provided for adjusting the vertical position of the guide rail relative to the conveyor.

5 Claims, 3 Drawing Figures

PATENTED DEC 4 1973

3,776,350

GUIDE RAIL SUPPORT

This invention relates to a guide rail for use on conveyors, and more particularly to a guide rail which can be readily adjusted in the horizontal and vertical directions.

On conveyor systems presently utilized in order to accomodate bottles of various widths and sizes it is necessary to adjust the position of the guide rails for the conveyor accordingly.

Heretofore, brackets fixed to the conveyor system by bolts and the like were utilized for adjusting the position of the guide rail. Such became burdensome especially when the conveyor was of a substantial length since these adjustments had to be made along the entire length of the conveyor.

Accordingly, it is an important object of the present invention to provide a guide rail for a conveyor and the like, which can be readily adjusted in both the horizontal and vertical directions so that articles of various sizes can be transported on the conveyor.

Another important object of the present invention is to provide a guide rail that can be utilized in conjunction with conveyors which can be readily adjusted by expanding a spring member carried on a rod that is, in turn, connected to the guide rail so as to permit the rod to be shifted.

Figure 1:
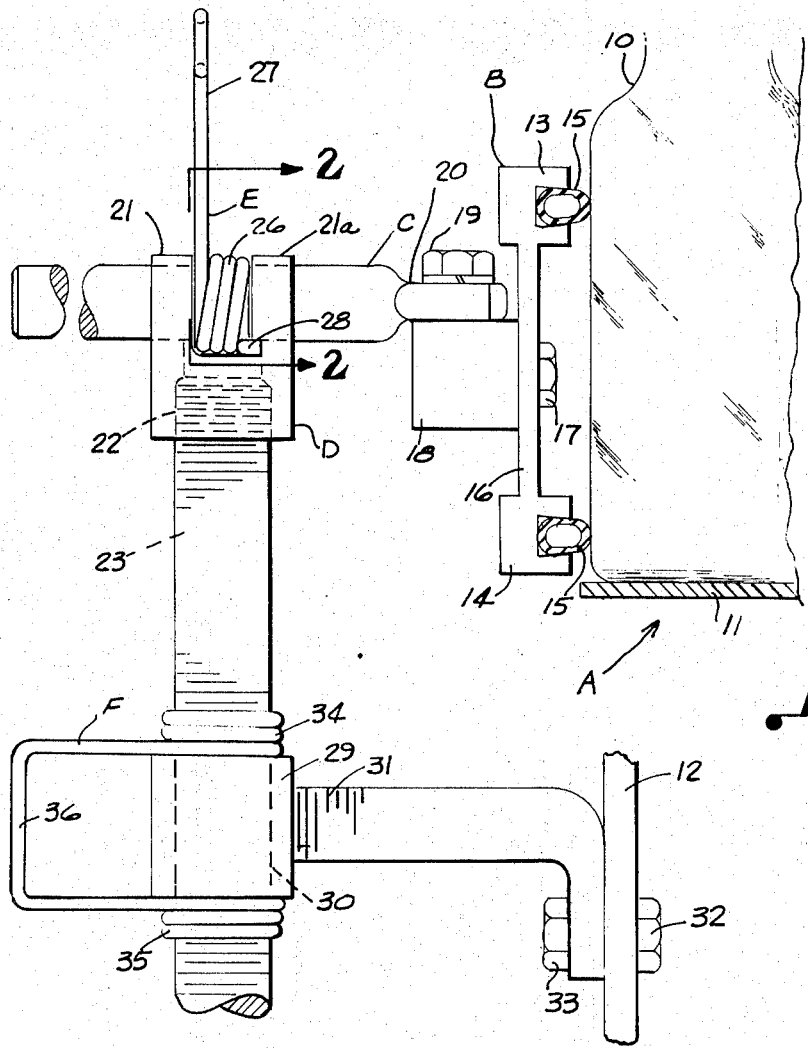
Figure 3:
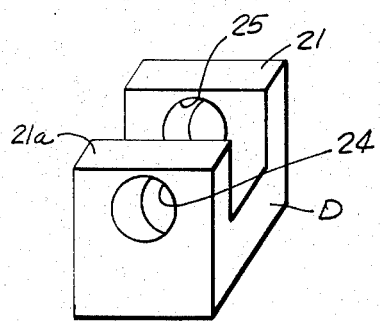
Figure 2:
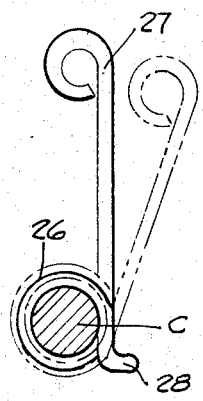

Other objects and advantages of this invention will become more apparent from a reading of the following detailed description and appended claims taken in conjunction with the accompanying drawing wherein:

FIG. 1 is a vertical sectional view illustrating a guide rail constructed in accordance with the present invention and a portion of a conveyor system, FIG. 2 is a transverse sectional view taken along the line 2—2 of FIG. 1, and FIG. 3 is an enlarged perspective view illustrating a bracket utilized in the invention.

Referring in more detail to FIG. 1 of the drawing, there is illustrated a guide rail for maintaining the position of articles on an elongated conveyor A as the articles are moved along the conveyor. The guide rails includes an elongated rail B which is carried closely adjacent the conveyor for engaging the articles being moved along the conveyor so as to maintain the articles in alignment. An elongated rod C supports the rail and, in turn, is supported by a bracket D. The bracket D has a hole extending therethrough, through which the rod C extends. A spring means E is carried on the rod C adjacent the bracket D gripping the rod C in one position and releasing the rod when in another position pursuant to application and removal of a force to and from the spring means E. Thus, the spring means E either engages the bracket preventing longitudinal movement of the elongated rod C when in one position, or permits longitudinal movement of the rod C to adjust the position of the rail relative to the articles being carried on the conveyor when in another position. It is also noted that a second spring means F is provided for adjusting the vertical position of the guide rail.

A bottle 10 is illustrated as being carried on a conventional conveyor belt 11 which is supported on a frame only a portion 12 of such being illustrated for purpose of clarity. The conveyor may be any suitable conveyor structure, such as illustred in U.S. Pat. No. 3,292,772, upon which articles such as bottles and the like are generally transported in single file. An elongated rail B is carried adjacent the side of the conveyor A for maintaining the bottles in a line. Another guide rail B may be positioned on the opposite side of the conveyor, however, such is not shown since it would merely be a duplicate of that shown in the drawing in FIG. 1. The guide rail includes a pair of vertically spaced channel members 13 and 14 which have flexible tubular shaped polyethylene wear strips 15 carried therein for engaging the article being shifted on the conveyor A. The two channel members 13 and 14 are joined by a vertical post 16 which has a bolt 17 extending therethrough for securing such to a block 18. The bolt 17 has threads on the inner end thereof for securing such into a threaded hole in the block 18. The block 18 also has a vertical threaded bore therein for receiving another bolt 19. The bolt 19, in turn, secures the elongated rod C to the block 18.

The elongated rod C has a flattened portion 20 adjacent the inner end with a hole extending therethrough for receiving the bolt 19.

The elongated rod C extends through a pair of aligned holes 24 and 25 extending through spaced outwardly extending arms 21 and 21a forming a part of the bracket D. A threaded bore 22 is carried in the bottom of the metal bracket D for receiving a threaded rod 23. The elongated rod C is allowed to slide freely through the aligned holes 24 and 25 in the outwardly extending arms 21 and 21a of the bracket D.

The spring means E includes a coiled spring which has a portion 26 which encircles the rod C and grips such tightly when the upwardly extending end 27 of the spring means E is in the position illustrated in full lines in FIG. 2. When a force is applied to rotate such clockwise, as illustrated in FIG. 2, the coiled portion around the rod C expands allowing the rod C to slide therethrough. The other end of the spring means E has a laterally extending portion 28 which engages the side of the bracket D for preventing such from rotating on the rod C when a force is applied to the outwardly extending portion 27.

Therefore, in order to adjust the position of the wear strips 15 relative to the bottle 10, it is only necessary to apply a clockwise force to the upwardly extending portion 27 of the spring means E which permits the rod to be shifted longitudinally through the bracket. In some embodiments it may be desired to score the rod directly under where the spring means E engages such so as to insure a locking action when no force is applied to the upwardly extending portion 27.

The position of the guide rail can be shifted vertically by means of the spring means F which encircles the vertical threaded rod 23.

The spring means F is carried on opposite sides of a bracket 29 which has a vertical bore 20 extending therethrough through which the vertical rod 23 extends. The bracket 30 also has a horizontal bore into which one end of a horizontal L-shaped bracket 31 is threaded. The other end of the L-shaped bracket 31 is bent inwardly at a right-angle and has a hole extending therethrough for accommodating a bolt 32. The bolt 32 extends through a hole in the frame member 12 of the conveyor and the L-shaped bracket 31 to secure the L-shaped bracket to the frame member 12 with a nut 33. It is to be understood, of course, that the L-shaped rod 31 could be attached to any fixed support adjacent the conveyor system.

The spring member F includes a pair of spaced coiled members 34 and 35 which are integral with an outwardly extending portion 36. The other ends of the coil members 34 and 35 are joined together on the other side of the bracket (not shown). This permits the spring member F to be rotated similar to the spring member E so as to release the compression on the vertical rod 23. When no force is applied to the outwardly extending portion 36 the spring members 34 and 35 grip the rod 23 tightly fixing such relative to the bracket 29 carried therebetween.

In summarizing the operation, in order to horizontally adjust the guide rail B a clockwise force is applied to the upwardly extending member 27 forming a part of the spring means E and the rod is allowed to slide freely through the bracket D. When the upwardly extending portion 27 of the spring is released such grips the rod C tightly preventing movement of the rod C relative to the bracket D. Such results from the spring member E abutting against the outwardly extending portions 21 and 21a. In order to adjust the vertical height of the guide rail the spring member F is utilized. When a force is applied to the outwardly extending portion 36 such causes the coiled portions 34 and 35 to be expanded allowing the vertical rod 23 to slide freely through the bracket 29. However, when a force is removed from the outwardly extending portion 36 the coiled portions 34 and 35 lock around the vertical rod 23 preventing such from moving relative to the bracket 29.

It is, of course, to be understood that either or both of the spring means E and F may be utilized for adjusting either the vertical or horizontal position of the guide rail B.

While a preferred embodiment of the invention has been described using specific terms, such description is for illustrative purposes only, and it is to be understood that changes and variations may be made without departing from the spirit and scope of the following claims.

What is claimed is:

1. A guide rail for maintaining the position of articles on an elongated conveyor as said articles are moved along said conveyor, said guide rail comprising: an elongated rail carried closely adjacent said conveyor for engaging said articles being moved along said conveyor for maintaining said articles in alignment, an elongated rod supporting said rail, a bracket, said elongated rod being supported by said bracket, a spring means carried on said rod adjacent said bracket gripping said rod in one position and releasing said rod when in another position pursuant to application and removal of a force to and from said spring means, whereby said spring means engages said bracket preventing longitudinal movement of said rod when in said one position and permits longitudinal movement of said rod to adjust the position of said elongated rail when is said another position.

2. The guide rail as set forth in claim 1, wherein said bracket has a hole extending therethrough and said elongated rod extends through said hole in said bracket.

3. The guide rail as set forth in claim 2, further comprising a second bracket having a hole therein, a vertical rod supporting said first bracket extending through said hole in said second bracket, a second spring means carried on said vertical rod adjacent said second bracket gripping said rod in one position and releasing said rod when in another position pursuant to application and removal of a force to and from said spring, whereby said spring means engages said second bracket preventing longitudinal movement of said rod when in said one position and permits longitudinal movement of said rod to adjust the vertical position of said elongated rail when in said another position.

4. The guide rail as set forth in claim 1, wherein said bracket has a pair of spaced outwardly extending arms having aligned holes extending therethrough, said rod extending through said aligned holes, and said spring means being carried on said rod between said spaced outwardly extending arms for fixing said rod against longitudinal movement when said spring means is in said one position and for permitting said rod to slide through said bracket when said spring means is in another position.

5. The guide rail as set forth in claim 4, wherein said spring means is a coiled spring encircling said rod which tightly grips said rod when in said one position and extends loosely around said rod when in said another position.

* * * * *